United States Patent Office 2,782,220
Patented Feb. 19, 1957

2,782,220

CONDENSATION OF DI-ALKYL SUCCINATES

Donald William Ingram, Norton-on-Tees, England, assignor to Imperial Chemical Industries Limited, a corporation of Great Britain No Drawing. Application March 29, 1954,
Serial No. 419,600

Claims priority, application Great Britain May 1, 1953

7 Claims. (Cl. 260—468)

This invention relates to the condensation of dialkyl succinates.

It is already known to condense dialkyl succinates to give derivatives of dialkyl cyclohexa-1,4-diene-2,5-diol-1,4-dicarboxylates. Thus, a dialkyl succinate, with a sodium alkoxide, gives rise to the di-sodium derivative of a dialkyl cyclohexa-1,4-diene-2,5-diol-1,4-dicarboxylate, according to the equation:

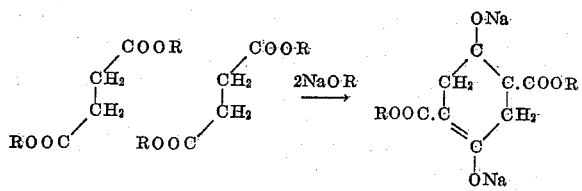

In reactions of this type, it has been proposed to employ, as condensing agent, sodium or potassium metal, used either alone or with a small amount of alcohol, sodium or potassium alkoxides, or sodium or potassium hydride.

In the processes hitherto disclosed for the production of dialkali metal derivatives of dialkyl cyclohexa-1,4-diene-2,5-diol-1,4-dicarboxylates, the product has, in general, been obtained in the form of a solid cake, which is difficult to use in subsequent reactions. On the contrary, the process of the present invention yields a product which is finely divided, and which is thus in a form eminently suitable for use in subsequent reactions.

The dialkali metal derivatives of the present invention are suitable for use as intermediates in the production of terephthalic acid and esters thereof by the procedures described in copending applications Serial No. 419,576 and Serial No. 419,578, filed on even date herewith.

According to the present invention, dialkali metal derivatives of dialkyl cyclohexa-1,4-diene-2,5-diol-1,4-dicarboxylates are obtained by contacting a lower aliphatic diester of succinic acid with an alkali metal alkoxide in the presence of at least one organic diluent, which is a liquid under the reaction conditions, selected from the group consisting of hydrocarbons and dialkyl succinates.

It is a feature of the present invention that the alkoxide may be employed alone, or dissolved in a lower aliphatic alcohol, which is conveniently the alcohol corresponding to the alkoxide. If an alcohol is employed together with the alkoxide, this alcohol should be removed after the succinate and alkoxide have been contacted.

Di-esters which are specially suitable for use in the process of the present invention are dimethyl and diethyl succinates. Similarly, alkali-metal alkoxides which are specially suitable are methoxides and ethoxides, sodium methoxide and sodium ethoxide being particularly suitable. If a lower aliphatic alcohol is used as a solvent for the alkoxide, it is convenient for this alcohol to correspond to the alkoxide employed. Thus, if sodium methoxide is used, it is desirable for methanol to be employed as solvent; similarly, if sodium ethoxide is used, ethanol is a suitable solvent.

The methods of carrying out the process of the present invention using sodium methoxide and dimethyl succinate as the starting materials will now be described; it will be understood that modifications of detail, obvious to a person skilled in the art, may be necessary when using other alkoxides and esters as starting materials.

The liquid organic diluent employed in the process of the present invention may be a liquid in which the product and at least one of the reactants are insoluble. Thus there may be used a paraffinic hydrocarbon, such as n-hexane, iso-octane, or an inert, higher hydrocarbon fraction. The reaction is carried out by stirring together the reactants at a temperature between room temperature and that at which the mixture refluxes. The reaction mixture then comprises undissolved disodium derivative of the dimethyl ester of cyclohexa-1,4-diene-2,5-diol-1,4-dicarboxylic acid, and two liquid layers, one comprising paraffinic hydrocarbon and unreacted dimethyl succinate and the other comprising methanol and alkoxide. The two layers are separated and the solid product filtered off. The paraffinic hydrocarbon-unreacted dimethyl succinate layer may be re-used for a subsequent condensation step, while the additional methanol formed during the reaction may be removed from the methanol-alkoxide layer, for example, by distillation, and the residual alkoxide re-used. In using a paraffinic hydrocarbon, it is desirable to select this so that the two liquid layers referred to above have sufficiently different densities to render practicable separation of the layers by decantation.

When using as a diluent an aromatic or alicyclic hydrocarbon, such as decahydronaphthalene, tetrahydronaphthalene, or a xylene fraction, the reaction mixture is heated to a temperature between the boiling point of methanol and that of the diluent, so that all the methanol formed during the reaction is removed by fractionation. The resulting mixture is a dispersion of the di-sodium derivative of the dimethyl ester of cyclohexa-1,4-diene-2,5-diol-1,4-dicarboxylic acid in a single liquid phase, comprising hydrocarbon diluent and unchanged dimethyl succinate if this is used in excess. The di-sodium derivative may be separated by filtration.

The methanol may distil off during the reaction from the liquid in the form of an azeotrope. To achieve this separation of the alcohol by distillation, it is necessary to use a diluent which boils sufficiently above that of the lower aliphatic alcohol or alcohols present in the reaction mixture to permit removing the alcohol or alcohols, without distilling off, as an azeotrope or otherwise, more than a minor amount of the diluent. Thus, when methanol is present, the diluent should boil at not less than 80° C., whereas if ethanol is present the boiling point of the diluent should be at least 90° C.

It is particularly convenient for the liquid diluent to be the dialkyl succinate employed in the condensation reaction. When the reaction is carried out in this way, an excess of, for example, dimethyl succinate over the amount of sodium alkoxide present in the reaction mixture is employed. In particular, it is convenient to use a dialkyl succinate:sodium alkoxide molar ratio of the order of 5:1. When operating in this manner, an operating temperature of 80° to 110° C. is suitable.

In the process of the present invention, lower aliphatic alcohols are present in the reaction product; for example, if dimethyl succinate is employed as the starting material, and sodium methoxide as the condensing agent, the reaction mixture will contain four moles of methanol per mole of di-sodium derivative of the dimethyl ester of cyclohexa-1,4-diene-2,5-diol-1,4-dicarboxylic acid. Of these four moles, two are bound in a complex with the said di-sodium derivative, this complex in the case of methanol being stable up to 140° C., and two are free and may be removed if desired by distillation. Any alcohol in excess of four moles per mole of di-sodium derivative tends to retard the condensation reaction and is, in consequence, preferably removed. Thus, if an alcohol is employed as a solvent for the alkoxide, it is desirable to remove this alcohol by distillation.

The dialkali metal derivatives of dialkyl cyclohexa-1,4-diene-2,5-diol-1,4-dicarboxylates produced in the process of the present invention are substantially insoluble in the reaction mixture, and are present therein in a finely-divided form; they may, therefore, be readily separated from the reaction mixture by, for example, filtration and may be converted to free dialkyl cyclohexa-1,4-diene-2,5-diol-1,4-dicarboxylates by treatment with acids as described in the above-mentioned Serial No. 419,578.

It is a particular feature of the present invention that the liquid diluent may be recycled for use in the condensation process. If dialkyl succinate is employed as the diluent, this is recycled, together with added dialkyl succinate to replace the quantity reacted, to the reaction zone together with a fresh amount of alkoxide.

In carrying out the process using recycle of diluent, the quantity of alcohol dissolved in the diluent will tend to incase with increasing operating time if provision is not made for alcohol removal. As stated above, this alcohol tends to retard the condensation reaction, and, in consequence, continuously or at intervals, steps must be taken to removal alcohol; this may be accomplished, for example by distilling off the alcohol from the diluent, either during the reaction, or before recycling the excess ester to the reaction zone.

It is evident from the information disclosed above that the process of the present invention may be operated in a batchwise or continuous manner. When continuous operation is employed it is necessary for the reactants to have an appreciable residence time in the reaction vessel.

The following process is convenient for producing dimethyl cyclohexa-1,4-diene-2,5-diol - 1,4 - dicarboxylates; sodium methoxide is dissolved in methanol, or a solution of sodium methoxide in methanol is produced by adding sodium to an excess of methanol; the solution is mixed with dimethyl succinate, the molar ratio of succinate:methoxide being of the order of 5:1. The temperature of the mixture is raised to 80° to 110° C. whereby the methanol added as methoxide solvent and methanol freed in the reaction are removed. The solid disodium derivative of the dimethyl cyclohexa-1,4-diene-2,5-diol-1,4-dicarboxylate is filtered off, and acidified whereby the free dimethyl ester of cyclohexa-2,5-diol-1,4-dicarboxylic acid is obtained. The recovered excess of dimethyl succinate (approximately 75% of the dimethyl succinate employed) is recycled for re-use in a repeated condensation reaction.

*Example 1*

73 grams (0.5 M) of dimethyl succinate were dissolved in 100 mls. of decahydronaphthalene and 27 grams (0.5 M) of sodium methoxide were added. The sodium methoxide addition took 30 minutes, during which time the mixture was stirred. The mixture was then heated on a bath at 195° C. in a nitrogen atmosphere for 4 hours. From the product 45 grams of dimethyl disodiocyclohexa-1,4-diene-2,5-diol-1,4-dicarboxylate - dimethanolate were obtained, corresponding to a yield of 54%.

*Example 2*

60 grams of sodium were added to 598.5 grams of methanol contained in a 5-litre flask. 1813 grams of dimethyl succinate were then added, the mixture being heated at a temperature of 80° to 110° C. in a nitrogen atmosphere for 4 hours. Methanol was distilled off from the product which was then filtered. The solid dimethyl disodiocyclohexa - 1,4 - diene - 2,5 - diol - 1,4 - dicarboxylate-dimethanolate obtained in this way was extracted with ether to remove any dimethyl succinate present, and the ether washings were bulked with the filtrate. From this filtrate and ether washings, 1371.3 grams of dimethyl succinate were recovered. The total weight of dimethyl-disodiocyclohexa-1,4-diene-2,5-diol-1,4-dicarboxylate-dimethanolate obtained in this example was 338 grams, which corresponds to 77% yield based on the amount of sodium used and 66% yield based on the amount of dimethyl succinate consumed.

*Example 3*

365 grams (2.5 M) of dimethyl succinate and 27 grams (0.5 M) of sodium methoxide were reacted together in a nitrogen atmosphere in the presence of varying amounts of methanol. The product obtained in each case was extracted with ether and the amount of dimethyl disodiocyclohexa - 1,4 - diene - 2,5 - diol - 1,4 - dicarboxylate-dimethanolate obtained was determined. The table below illustrates the deleterious effects of methanol in excess of the amount liberated during the reaction.

| Added Methanol (ml./g. dimethyl succinate) | Temperature, °C. | Reaction Time, Hours. | Pass Yield, Percent |
|---|---|---|---|
| 4.33 | 65 | 5 | 0 |
| 2.87 | 65 | 12 | 0 |
| 1.65 | 65 | 4 | 7 |
| 1.0 | 70 | 4 | 17 |
| 0.5 | 75 | 4 | 22 |
| 0.25 | 85 | 4 | 27 |
| 0.0 | 91 | 4 | 63 |

I claim:

1. A process for the production of an alcohol complex of a dialkali metal derivative of a lower dialkyl cyclohexa - 1,4 - diene - 2,5 - diol - 1,4 - dicarboxylate, which comprises reacting a lower dialkyl succinate with an alkali metal alkoxide in the presence of an organic diluent which is liquid under reaction conditions and has a boiling point above that of any alcohol formed in the reaction, said diluent being selected from the group consisting of excess succinate and paraffinic, aromatic and cyclic hydrocarbons.

2. The process of claim 1 wherein said alkali metal alkoxide is dissolved in the corresponding alcohol, said alcohol being subsequently removed from said reaction mixture.

3. The process of claim 1 wherein said succinate is dimethyl succinate and the alkali metal alkoxide is an alkali metal methoxide dissolved in methanol.

4. The process of claim 1 wherein said succinate is diethyl succinate and said alkali metal alkoxide is an alkali metal ethoxide dissolved in ethanol.

5. The process of claim 1 wherein the organic diluent is excess dialkyl succinate.

6. The process of claim 1 wherein said reaction is carried out at a temperature between the boiling point of the alcohol of said alkoxide and that of said diluent whereby free alcohol formed in the reaction is distilled off.

7. A process as claimed in claim 5 in which the dialkyl succinate:alkoxide molar ratio is of the order of 5:1 and the reaction is carried out at a temperature of 80° to 110° C.

References Cited in the file of this patent

"Organic Reactions," vol. I, Adams, ed., pgs. 275, 295; 1942.